US006719265B2

(12) United States Patent
Kloda et al.

(10) Patent No.: US 6,719,265 B2
(45) Date of Patent: Apr. 13, 2004

(54) ELECTROMAGNETIC ACTUATOR FOR A VALVE IN THE AUTOMOTIVE FIELD

(75) Inventors: Martin Kloda, Köln (DE); Markus Herring, Neuss (DE); Gunther Weitkamp, Neuss (DE); Heinz Creutz, Jüchen (DE)

(73) Assignee: Pierburg GmbH, Neuss (DE)

( * ) Notice: Subject to any disclaimer, the term of this patent is extended or adjusted under 35 U.S.C. 154(b) by 80 days.

(21) Appl. No.: 10/234,427

(22) Filed: Sep. 4, 2002

(65) Prior Publication Data

US 2003/0042454 A1 Mar. 6, 2003

(30) Foreign Application Priority Data

Sep. 4, 2001 (DE) .......................................... 101 43 307

(51) Int. Cl.[7] .................................................. F16K 31/02

(52) U.S. Cl. ............... 251/76; 257/129.15; 257/129.19; 335/265

(58) Field of Search ........................ 257/129.15, 129.19, 257/214, 76; 335/265; 123/568.11

(56) References Cited

U.S. PATENT DOCUMENTS 1,817,592 A * 8/1931 Sokoloff ..................... 335/259
3,473,780 A * 10/1969 Harms .......................... 251/76
3,737,141 A * 6/1973 Zeuner .................. 251/129.19
3,961,298 A * 6/1976 Jaffe et al. .................. 335/259
4,008,876 A * 2/1977 Bastle .................... 251/129.19
6,047,718 A * 4/2000 Konsky et al. ........ 251/129.15

FOREIGN PATENT DOCUMENTS

DE 19831140 1/2000

* cited by examiner

*Primary Examiner*—John Bastianelli
(74) *Attorney, Agent, or Firm*—Ladas & Parry

(57) ABSTRACT

An electromagnetic actuator, particularly for use with valves in the automotive field, such as, for example, exhaust-gas recirculation valves, secondary-air valves, etc., having a housing with an electrical connector plug, a magnetic yoke, a coil unit, a guide element, a magnetic core and an armature that cooperates with a valve adjusting member. The armature is formed by first and second armature elements, the second armature element being in the form of a disk mounted so that it is spaced from the first armature element by an air gap when current is not supplied to the actuator whereby high, abrupt force is developed on the first armature element to open the valve when current is supplied.

11 Claims, 2 Drawing Sheets

ELECTROMAGNETIC ACTUATOR FOR A VALVE IN THE AUTOMOTIVE FIELD

FIELD OF THE INVENTION

The invention relates to electromagnetic actuators, particularly for use with valves in the automotive field, such as, exhaust-gas recirculation valves, secondary-air valves, etc. The electromagnetic actuator has a housing with an electrical connector plug, a magnetic yoke, a coil unit, a guide element, a magnetic core and an armature, which cooperates with a valve actuator.

BACKGROUND AND PRIOR ART

Such an actuator is disclosed in DE-A1-198 31 140 combined with an exhaust-gas recirculation valve. A cylindrical armature acts as a linear magnet, to move the valve closing member into an open position of the exhaust-gas recirculation valve, by means of a valve actuator that cooperates therewith, when current is supplied to the coil unit. When the current supply to the coil unit ceases, the valve closing member moves back to a closed position of the exhaust-gas recirculation valve by means of a spring, which acts on the valve actuator.

In particular, in valves in the automotive field, such as, exhaust-gas recirculation valves, secondary-air valves and the like, there may occur gumming or freezing, etc. of the valve closing member due to the high thermal loads, as well as due to environmental influences. The valve then can no longer be opened and its function is no longer assured. In most cases this requires an expensive repair or replacement of the valve.

SUMMARY OF THE INVENTION

An object of the invention is to provide a valve actuator which avoids the problem described above.

This object is achieved according to the invention in that the armature is comprised of first and second armature elements and wherein the second armature element is formed as a disk and when current is not supplied to the actuator, the disk is spaced from the first armature element by an air gap.

In this way, the second armature element acts as a plate magnet when current is supplied to the coil unit, and the plate magnet applies an abrupt pull on the first armature element and in this way produces a substantially increased opening force on the valve closing member. When the first armature element is pulled against the second armature element, both armature elements act together as a single armature similar to the linear magnet, which opens the valve closing member in the conventional way. Thus, the same function can be assured with a smaller coil. It has been found particularly advantageous that when the coil unit, the magnetic core and armature elements are appropriately designed, the air gap is between 0.1 mm and 2.0 mm. A particularly simple construction of the electromagnetic actuator is obtained if the valve actuator is secured to the first armature element in a form-fitting or frictional manner. A sleeve is secured to the second armature element in a form-fitting or frictional manner and is mounted so that it can move in the magnetic core, the valve actuator being displaceable in the sleeve whereby a particularly simple and compact construction of the electromagnetic actuator is obtained. The sleeve has a projecting end, which is applied against the underside of the magnetic core in an initial position of the second armature element when current is not supplied to the coil unit.

It has also proven advantageous if the end of the valve actuator terminates at the projecting end of the sleeve or projects slightly beyond it in order to assure opening of the valve closing member with a small stroke of the valve actuator. In order to assure proper guiding of the armature and the necessary magnetic isolation, a bearing bush is arranged both in the guide element and in the magnetic core for respective movable mounting of the first and second armature elements while providing the magnetic isolation between the armature elements.

The invention is also directed to the combination of a valve with the electromagnetic actuator, wherein a valve adjusting member of the actuator cooperates with the valve closing member which is guided in a valve housing, the valve closing member being joined, in turn, with a sleeve element by means of a coupling. A restoring spring acts on the coupling and is supported in the valve housing such that the valve adjusting member, the valve closing member and the sleeve element are biassed to close the valve when current is not supplied to the coil unit.

DETAILED DESCRIPTION

Figure 1:
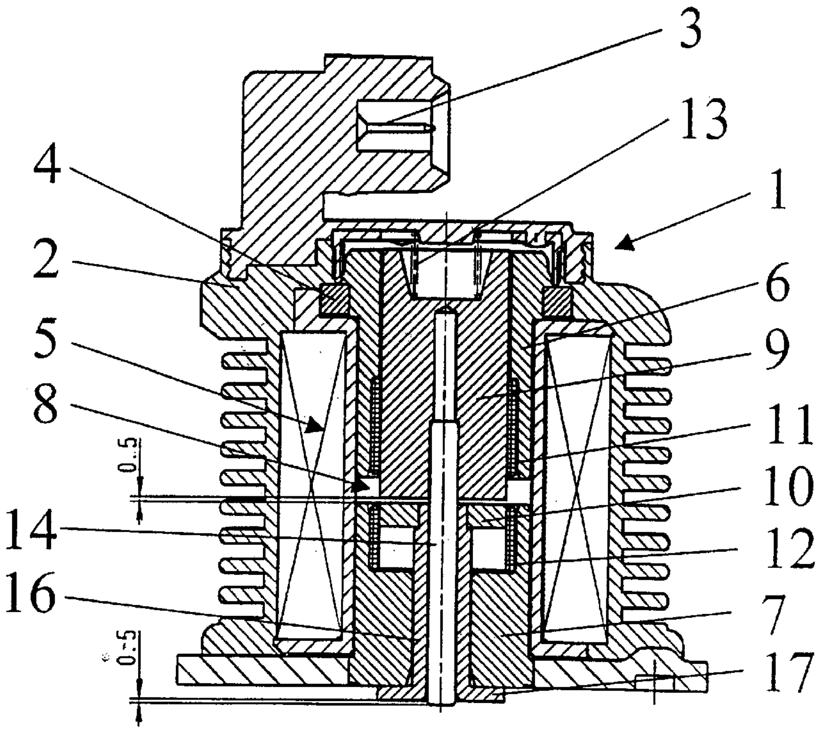
FIG. 1 is a sectional view of the electromagnetic actuator according to the invention in a state when current is not supplied.

FIG. 1 shows an electromagnetic actuator 1, which is particularly suitable for use with valves in the automotive field, such as, exhaust-gas recirculation valves, secondary-air valves and the like. The electromagnetic actuator 1 comprises a housing 2 with an electrical connector plug 3, by means of which current is supplied to the actuator to control its operation. A magnetic yoke 4, a coil unit 5, a guide element 6, a magnetic core 7 and an armature 8 are arranged in the housing in a conventional manner.

According to the invention, the armature 8 is comprised of two armature elements 9 and 10. Bearing bushes 11 and 12 are provided in the guide element 6 and in the magnet core 7 for guiding the armature elements of the armature 8. The first armature element 9 is biassed by a pressure spring 13, which is supported in conventional manner in housing 2 to oppose movement of the actuator.

A valve adjusting member 14, which cooperates with a valve closing member 15 (FIG. 4) is secured to the first armature element 9, for example, by a screw connection (not shown). The valve adjusting member 14 extends through a sleeve 16 and is movable in a longitudinal direction in the sleeve 16. Sleeve 16 has a projecting end 17, which is applied against the underside of the magnetic core 7. The second armature element 10 is secured to the upper end of sleeve 16. Sleeve 16 is mounted so that it can be moved in the longitudinal direction in the magnetic core 7.

In the state shown in FIG. 1 when no current is supplied to the coil unit 5, the first armature element 9 and the second armature element 10 are spaced from one another to form an air gap therebetween of 0.5 mm. In addition, the end of the valve adjusting member 14 projects 0.5 mm beyond the end of the projecting end 17 of sleeve 16.

Figure 2:
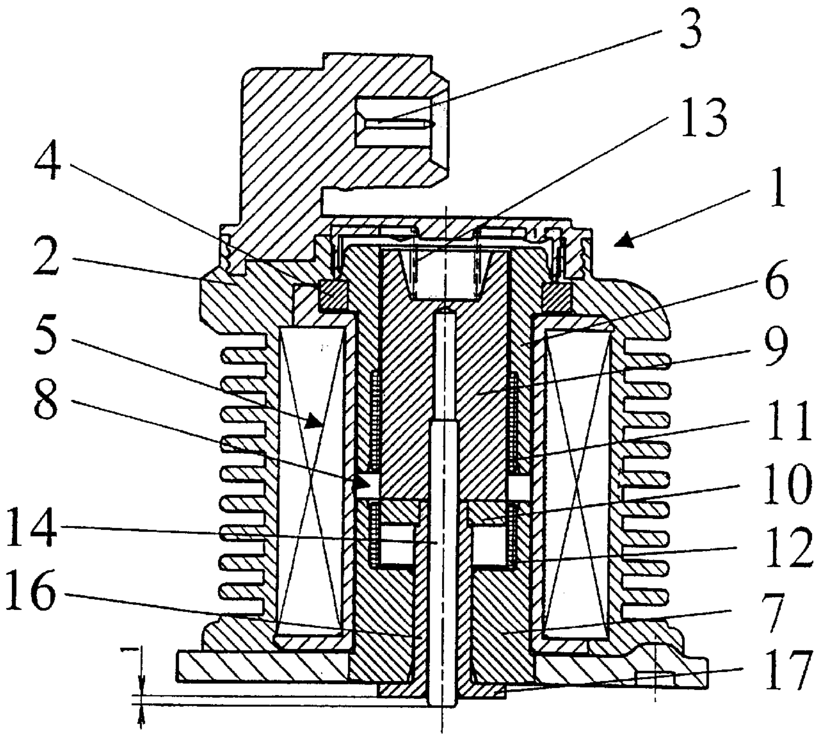
FIG. 2 is a sectional view of the actuator according to the invention in a subsequent state when current is supplied and a first armature element contacts a second armature element.

FIG. 2 shows the electromagnetic actuator 1 of FIG. 1 just after supplying current to the coil unit 5. The second armature element 10, which acts as a plate magnet due to its disk configuration and the air gap formed with the first armature element, pulls on the first armature element 9 with very high magnetic force and thus effects a stroke of 0.5 mm of the valve adjusting member 14 with a substantially greater force than in the case of a stroke produced by a conventional linear magnet. The air gap between the first and second armature elements can be between 0.1 and 2 mm to develop the high force of the disk on the first armature element 9.

Figure 3:
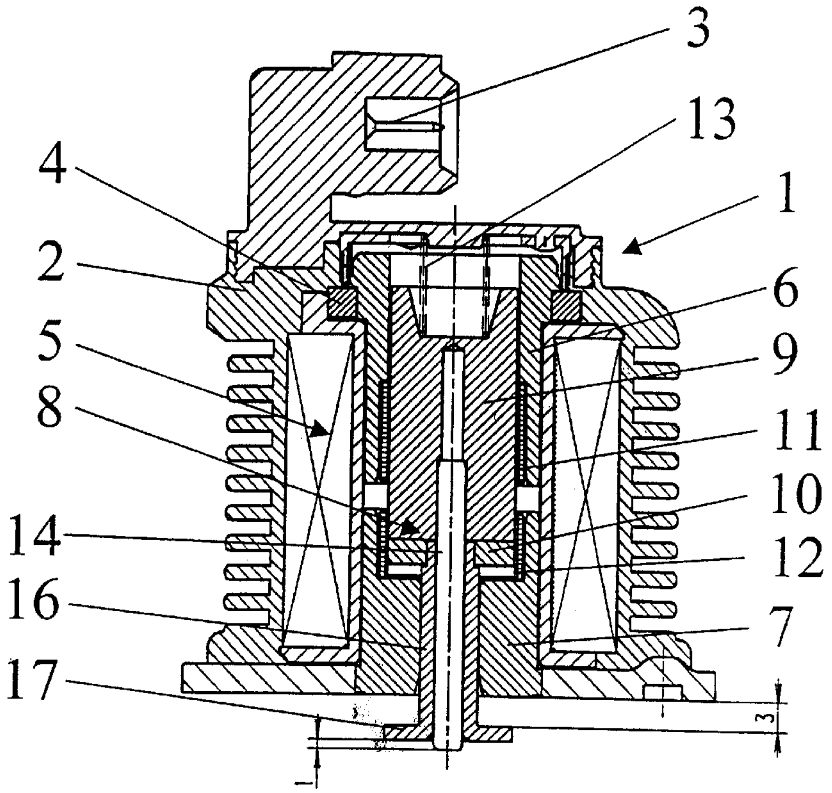
FIG. 3 is a sectional view of the actuator according to the invention in a subsequent state when current is supplied and just before the armature reaches its maximum stroke position.

Subsequently, in the current-supplied state, the armature 8, comprised of the armature elements 9 and 10 now applied against one another, acts as a linear magnet, whereby the valve adjusting member 14 together with the sleeve 16, are longitudinally moved as shown in FIG. 3.

Figure 4:
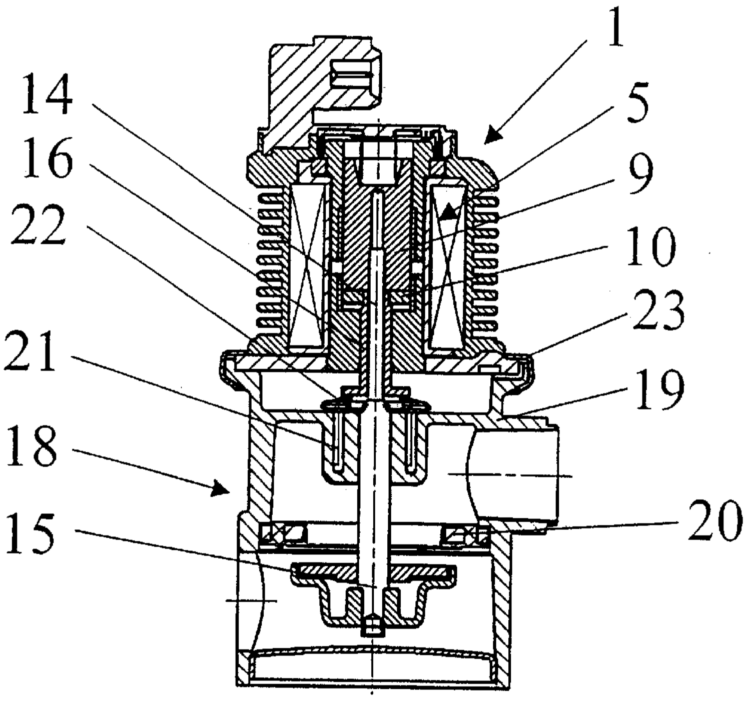
FIG. 4 is a sectional view of the actuator in combination with a valve according to the invention in an open position of the valve.

FIG. 4 shows an exhaust-gas recirculation valve in sectional view with the actuator 1 according to the invention. The exhaust-gas recirculation valve 18 has a valve housing 19, which supports the valve closing member 15 in conventional manner, which in turn cooperates with a conventional valve seat 20. A restoring spring 21, which is supported in valve housing 19 and acts on a coupling 22. The coupling 22, which can also be configured as a spring element, connects the sleeve element 16 with the valve closing member 15. Accordingly, the restoring spring 21 acts on coupling 22 and thus on sleeve element 16, valve closing member 15 and valve adjusting member 14, to move back to the initial position when current is not supplied to the coil unit 5. The housing 2 and the valve housing 19 are joined together by a wrap-around sheet-metal ring 23.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. An electromagnetic actuator, for a valve in the automotive field comprising a housing having an electrical connector plug, a magnetic yoke, a coil unit, a guide element, a magnetic core and an armature which operates a valve adjusting member, said armature including first and second armature elements, said second armature element being configured as a disk and being mounted in spaced relation from the first armature element when current is not supplied to the coil unit wherein the first armature element moves toward and contacts the second armature element and both armatures act together as a single armature as current is supplied.

2. The electromagnetic actuator according to claim 1, wherein said second armature element forms an air gap with said first armature element of between 0.1 mm and 2.0 mm.

3. The electromagnetic actuator according to claim 1, wherein said valve adjusting member is secured to the first armature element.

4. The electromagnetic actuator according to claim 3, further comprising a sleeve secured to the second armature element and mounted so that the sleeve is movable in the magnetic core, said valve adjusting member being movable in said sleeve.

5. The electromagnetic actuator according to claim 4, wherein said sleeve has a projecting end piece, which is applied against an underside of the magnetic core in an initial position of the second armature element when no current is supplied to the core unit.

6. The electromagnetic actuator according to claim 5, wherein said valve adjusting member is at or projects slightly beyond said projecting end piece when no current is supplied to the actuator.

7. The electromagnetic actuator according to claim 1, comprising a bearing bush arranged in the guide element and in the magnetic core for movable support of the first and second armature elements while also magnetically isolating the armature elements.

8. The electromagnetic actuator of claim 1, comprising a spring acting on the first armature element to oppose movement thereof when current is supplied to the coil unit.

9. A valve in combination with the electromagnetic actuator according to claim 4, wherein the valve adjusting member cooperates with a valve closing member of the valve guided in a valve housing, said valve closing member being connected to said sleeve by a coupling, a restoring spring acting on said coupling and supported in the valve housing, such that the valve adjusting member, the valve closing member and the sleeve are biassed to close the valve when current is not supplied to the coil unit.

10. The combination of claim 9, comprising a ring securing the actuator housing and the valve housing together.

11. The combination of claim 9, comprising a valve seat on the valve housing against which the valve closing member is engages when no current is supplied to the coil unit.

* * * * *